United States Patent
Yoshida

(10) Patent No.: US 10,391,941 B2
(45) Date of Patent: Aug. 27, 2019

(54) VEHICULAR VISUAL RECOGNITION DEVICE

(71) Applicant: KABUSHIKI KAISHA TOKAI-RIKA-DENKI-SEISAKUSHO, Aichi (JP)

(72) Inventor: Shigeki Yoshida, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 15/529,208

(22) PCT Filed: Nov. 19, 2015

(86) PCT No.: PCT/JP2015/082587
§ 371 (c)(1),
(2) Date: May 24, 2017

(87) PCT Pub. No.: WO2016/088570
PCT Pub. Date: Jun. 9, 2016

(65) Prior Publication Data
US 2017/0327042 A1    Nov. 16, 2017

(30) Foreign Application Priority Data
Dec. 5, 2014   (JP) .................. 2014-247094

(51) Int. Cl.
*B60R 1/074* (2006.01)
*B60R 1/072* (2006.01)

(52) U.S. Cl.
CPC .............. *B60R 1/074* (2013.01); *B60R 1/072* (2013.01)

(58) Field of Classification Search
CPC ................................ B60R 1/072; B60R 1/074
(Continued)

(56) References Cited

U.S. PATENT DOCUMENTS 5,432,641 A * 7/1995 Mochizuki .............. B60R 1/074
359/841
5,636,071 A * 6/1997 Mochizuki .............. B60R 1/074
248/476

(Continued)

FOREIGN PATENT DOCUMENTS

| JP | 2001-151020 | * 6/2001 |
| JP | 2004306840 | * 11/2004 |

(Continued)

OTHER PUBLICATIONS

International Search Report issued in a corresponding application PCT/JP2015/082587 dated Feb. 16, 2016.

(Continued)

*Primary Examiner* — Ricky D Shafer
(74) *Attorney, Agent, or Firm* — Roberts Mlotkowski Safran Cole & Calderon, P.C.

(57) ABSTRACT

In a vehicular door mirror device, a main body section of a motor is supported by an assembly tube of a case in a horizontal direction, and a gear plate is supported by a support tube of the case in the horizontal direction. Therefore, dimensional variation in the horizontal direction between central axis lines of an output shaft of the motor and the gear plate can be suppressed, and variation in meshing amount of a worm gear of the output shaft and the gear plate, and a worm shaft, can be suppressed.

10 Claims, 7 Drawing Sheets

(58) Field of Classification Search
USPC .................................................. 359/841, 877
See application file for complete search history.

(56) References Cited

U.S. PATENT DOCUMENTS

| | | | | |
|---|---|---|---|---|
| 6,811,270 B2* | 11/2004 | Yoshida | .................... | B60R 1/06 359/507 |
| 6,874,896 B2* | 4/2005 | Yoshida | .................. | B60R 1/072 359/841 |
| 7,290,890 B2* | 11/2007 | Yoshida | .................. | B60R 1/074 359/841 |
| 7,488,081 B2* | 2/2009 | Yoshida | .................. | B60R 1/074 359/841 |
| 7,857,278 B2* | 12/2010 | Yoshida | .................. | B60R 1/074 248/479 |
| 9,630,559 B2* | 4/2017 | Umino | ...................... | B60R 1/06 |
| 2007/0092368 A1 | 4/2007 | Yoshida et al. | | |
| 2013/0107383 A1* | 5/2013 | Kudo | .................... | B60R 1/074 359/841 |
| 2016/0159284 A1* | 6/2016 | Umino | ................... | B60R 1/006 359/872 |
| 2017/0297492 A1* | 10/2017 | Yoshida | .................. | B60R 1/076 |

FOREIGN PATENT DOCUMENTS

| | | | |
|---|---|---|---|
| JP | 2007-106311 A | | 6/2007 |
| JP | 2014-004960 | * | 1/2014 |
| JP | 2014205393 A | | 10/2014 |

OTHER PUBLICATIONS

Office Action issued in the corresponding Japanese Application No. 2014-247094 dated Apr. 3, 2018, 5 pages.

* cited by examiner

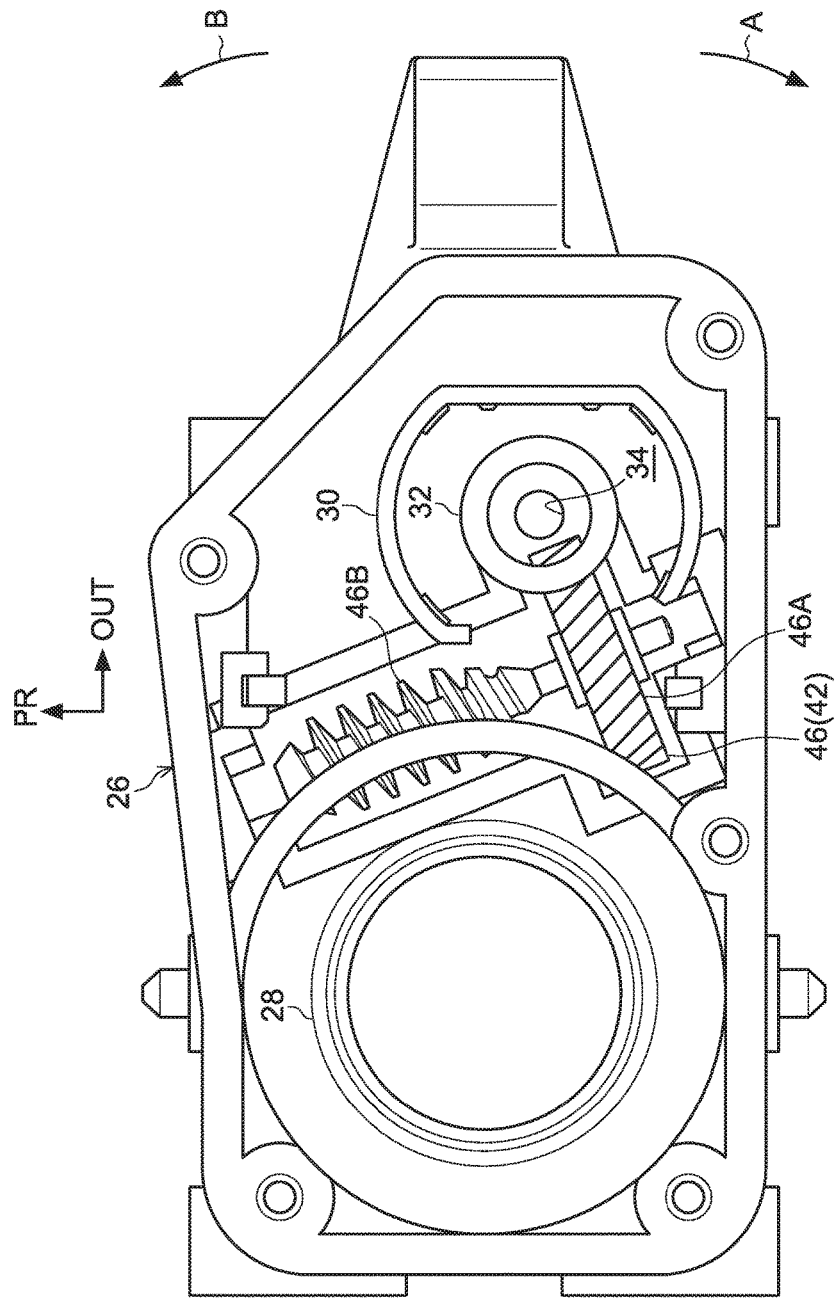

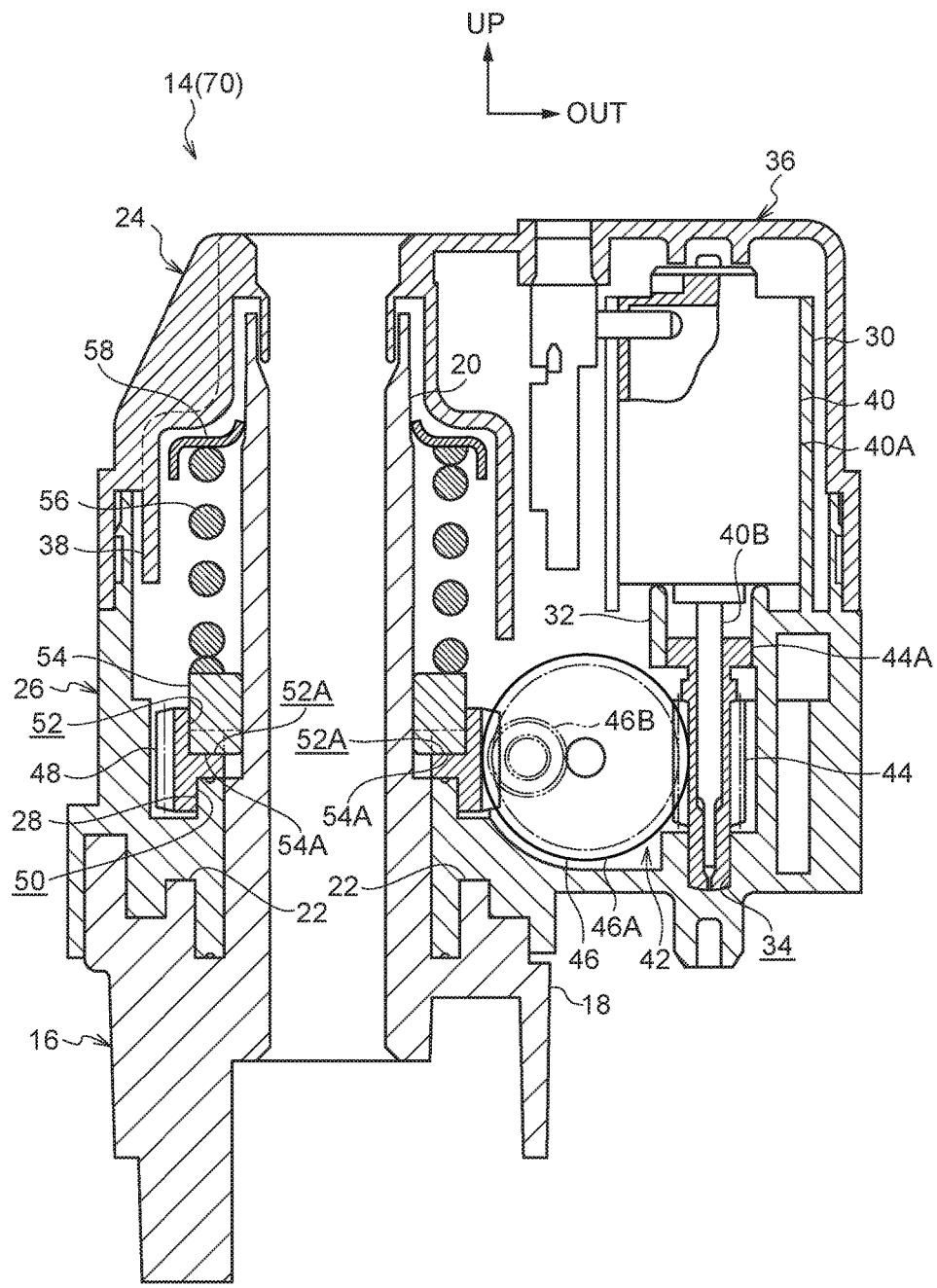

VEHICULAR VISUAL RECOGNITION DEVICE

CROSS-REFERENCE TO RELATED APPLICATIONS

The present application is a U.S. National Phase of PCT/JP2015/082587 filed on Nov. 19, 2015 claiming priority to Japanese Patent application No. 2014-247094 filed Dec. 5, 2014. The disclosure of the PCT Application is hereby incorporated by reference into the present Application.

TECHNICAL FIELD

The present invention relates to a vehicular visual recognition device in which a visual recognition means assists visual recognition of an occupant of a vehicle.

BACKGROUND ART

In a door mirror device described in Japanese Patent Application Laid-Open Publication No. 2007-106311, a motor is supported by a case main body, and a worm gear is coupled to a rotating shaft of the motor, and a lower end section of the worm gear is supported by the case main body in a radial direction. Furthermore, a gear plate is supported in a radial direction by a stand, and the case main body is pivoted by a drive force generated by the motor being transmitted to the gear plate via the worm gear.

Now, in such a door mirror device, it is preferable that dimensional variation between the motor or worm gear and the gear plate can be suppressed.

SUMMARY OF INVENTION

In view of the above-described facts, the present invention has an object of obtaining a vehicular visual recognition device in which dimensional variation between a drive means or initial-stage gear and a limit gear can be suppressed.

A vehicular visual recognition device of a first aspect of the present invention includes: a support body supported by a vehicle body side; a pivoting member pivotably supported by the support body; a drive means supported by the pivoting member and configured so as to be capable of generating a drive force; a limit gear supported in a radial direction by the pivoting member, rotation of the limit gear being limited, and the drive force generated by the drive means being transmitted to the limit gear whereby the pivoting member is pivoted; and a visual recognition means provided so as to be capable of pivoting integrally with the pivoting member, the visual recognition means assisting visual recognition of an occupant of a vehicle, and the visual recognition means being retracted or deployed by the pivoting member being pivoted.

A vehicular visual recognition device of a second aspect of the present invention includes: a support body supported by a vehicle body side; a pivoting member pivotably supported by the support body; a drive means configured so as to be capable of generating a drive force; a transmission mechanism which has at least one transmission gear disposed at the pivoting member, and in which a plurality of axial direction positions of an initial-stage gear, which is a transmission gear to which the drive force generated by the drive means is initially transmitted, are supported by the pivoting member in a radial direction, the transmission mechanism transmitting the drive force generated by the drive means; a limit gear supported in the radial direction by the pivoting member, rotation of the limit gear being limited, and the drive force generated by the drive means being transmitted to the limit gear via the transmission mechanism whereby the pivoting member is pivoted; and a visual recognition means provided so as to be capable of pivoting integrally with the pivoting member, the visual recognition means assisting visual recognition of an occupant of a vehicle, and the visual recognition means being retracted or deployed by the pivoting member being pivoted.

A vehicular visual recognition device of a third aspect of the present invention is the vehicular visual recognition device of the first aspect or the second aspect of the present invention, wherein an inner portion in the radial direction of the limit gear is supported in an axial direction by the pivoting member.

In the vehicular visual recognition device of the first aspect of the present invention, the support body is supported by the vehicle body side, and the pivoting member is pivotably supported by the support body. Furthermore, the visual recognition means is provided so as to be capable of pivoting integrally with the pivoting member, and the visual recognition means assists visual recognition of the occupant of the vehicle.

In addition, by the drive means being configured so as to be capable of generating the drive force, and by rotation of the limit gear being limited, and the drive force generated by the drive means being transmitted to the limit gear, the pivoting member is pivoted, whereby the visual recognition means is retracted or deployed.

Now, the drive means is supported by the pivoting member, and the limit gear is supported in the radial direction by the pivoting member. As a result, dimensional variation between the drive means and the limit gear can be suppressed.

In the vehicular visual recognition device of the second aspect of the present invention, the support body is supported by the vehicle body side, and the pivoting member is pivotably supported by the support body. Furthermore, the visual recognition means is provided so as to be capable of pivoting integrally with the pivoting member, and the visual recognition means assists visual recognition of the occupant of the vehicle.

In addition, by the drive means being configured so as to be capable of generating the drive force and the transmission mechanism having the at least one transmission gear disposed at the pivoting member, and by rotation of the limit gear being limited, and the drive force generated by the drive means being transmitted to the limit gear via the transmission mechanism, the pivoting member is pivoted, whereby the visual recognition means is retracted or deployed.

Now, the plurality of axial direction positions of the initial-stage gear, which is the transmission gear to which the drive force generated by the drive means is initially transmitted, are supported by the pivoting member in the radial direction, and the limit gear is supported in the radial direction by the pivoting member. As a result, dimensional variation between the initial-stage gear and the limit gear can be suppressed.

In the vehicular visual recognition device of the third aspect of the present invention, an inner portion in the radial direction of the limit gear is supported in the axial direction by the pivoting member. As a result, an increase in sliding friction of the pivoting member and the limit gear can be suppressed, even when the limit gear is supported in the radial direction by the pivoting member.

BRIEF DESCRIPTION OF DRAWINGS

FIG. 6 is a plan view looking from above showing a case and a worm shaft of the retraction mechanism in the vehicular door mirror device according to the first embodiment of the present invention.

FIG. 7 is a cross-sectional view looking from a vehicle rear showing a retraction mechanism in a vehicular door mirror device according to a second embodiment of the present invention.

DESCRIPTION OF EMBODIMENTS

First Embodiment

Figure 1:
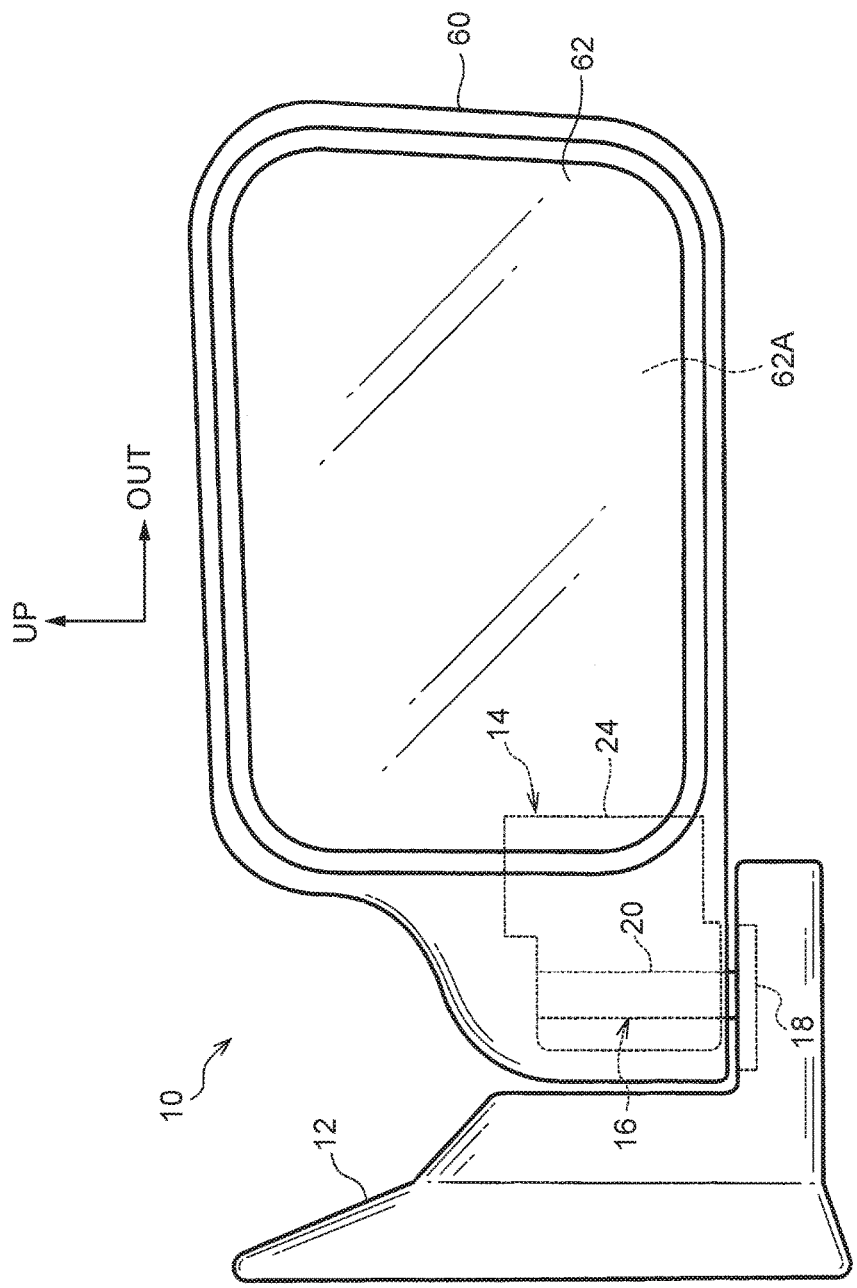
FIG. 1 is a front view looking from a vehicle rear showing a vehicular door mirror device according to a first embodiment of the present invention.

FIG. 1 shows a front view in which a vehicular door mirror device 10 acting as a vehicular visual recognition device according to a first embodiment of the present invention, is seen from a vehicle rear. Note that in the drawings, a front side of a vehicle is indicated by an arrow FR, an outer side in a vehicle width direction (a right side of the vehicle) is indicated by an arrow OUT, and an upper side is indicated by an arrow UP.

The vehicular door mirror device 10 according to the present embodiment is disposed on an outside of the vehicle, mounted in a central section in an up-down direction and at a vehicle front side end of a side door (specifically, a front side door) acting as a door of the vehicle.

As shown in FIG. 1, the vehicular door mirror device 10 includes a stay 12 acting as a mounting member, and an inner end in the vehicle width direction of the stay 12 is fixed to the side door (a vehicle body side), whereby the vehicular door mirror device 10 is mounted on the side door.

A retraction mechanism 14 (an electrically-powered retraction mechanism, a retractor) acting as a pivoting mechanism is supported by an upper side of an outer portion in the vehicle width direction of the stay 12.

Figure 2:
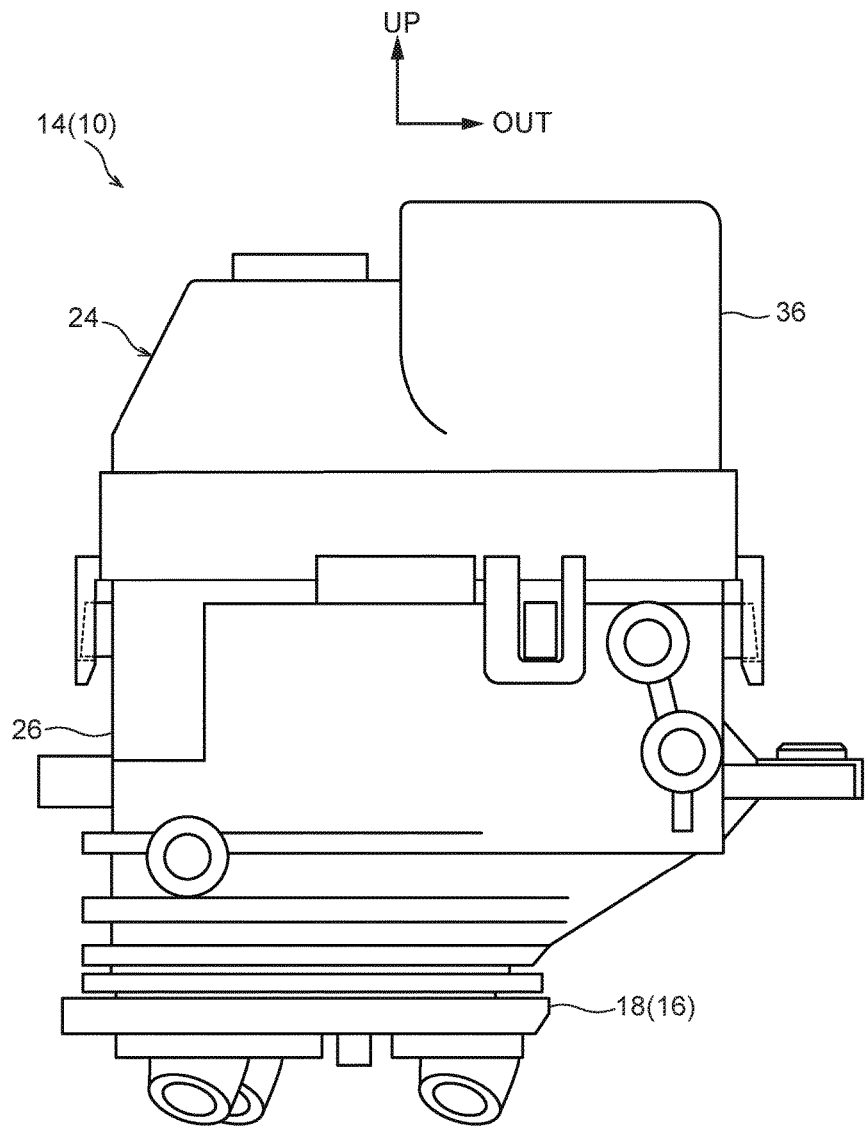
FIG. 2 is a front view looking from the vehicle rear showing a retraction mechanism in the vehicular door mirror device according to the first embodiment of the present invention.
Figure 3:
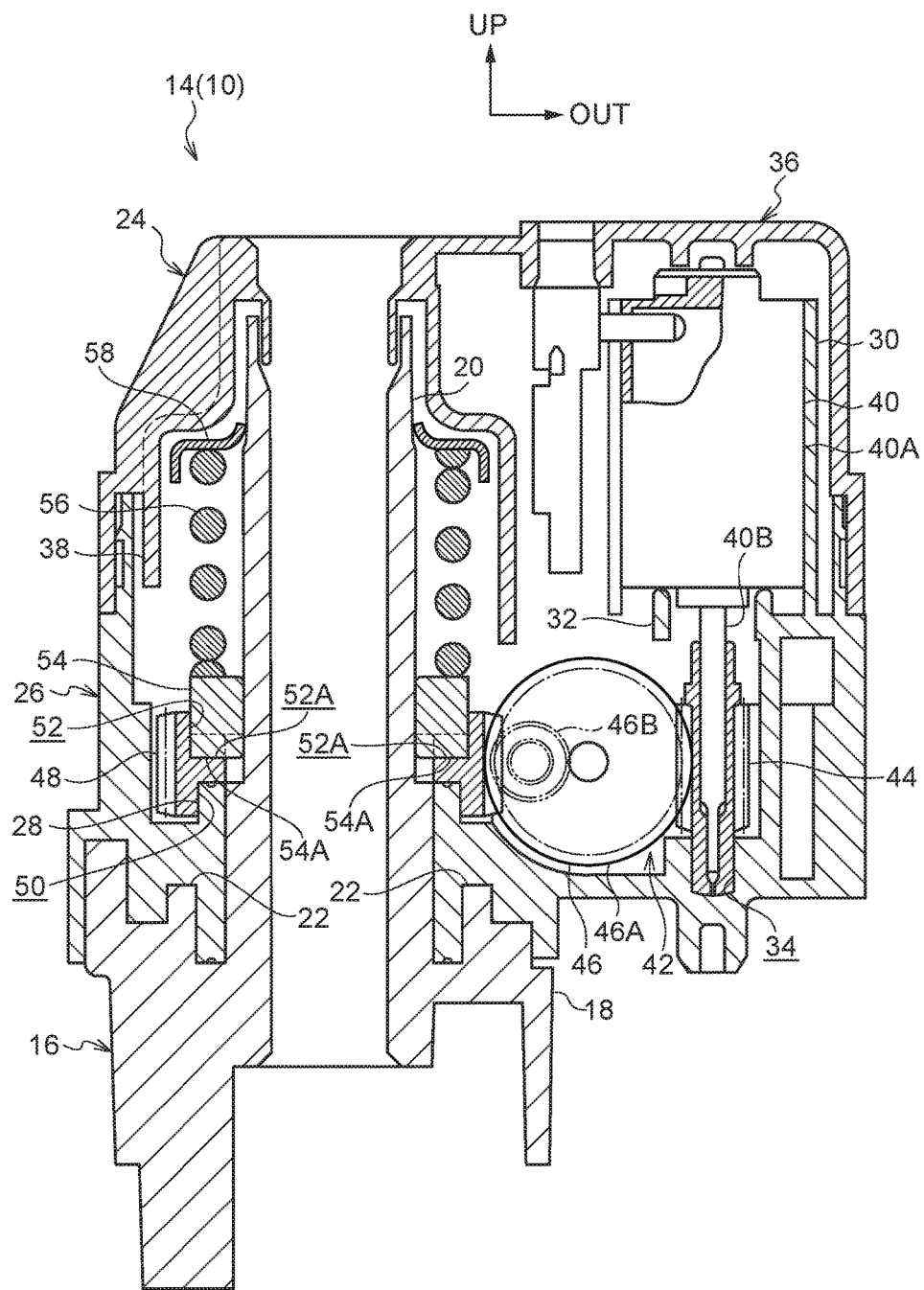
FIG. 3 is a cross-sectional view looking from the vehicle rear showing the retraction mechanism in the vehicular door mirror device according to the first embodiment of the present invention.
Figure 4:
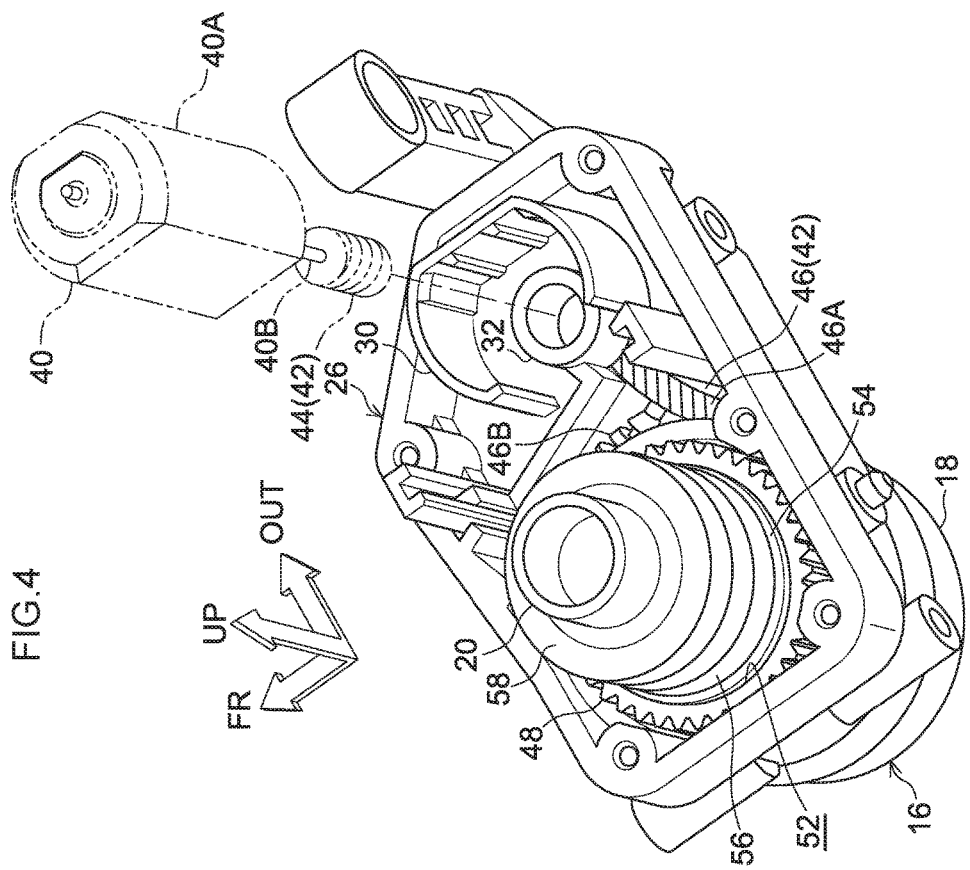
FIG. 4 is a perspective view looking obliquely from above and rearward of a vehicle showing main sections of the retraction mechanism in the vehicular door mirror device according to the first embodiment of the present invention.

As shown in FIGS. 2 to 4, a stand 16 acting as a support body is provided at the retraction mechanism 14. A substantially circular plate shaped fixing section 18 is provided at a lower end of the stand 16, and by the fixing section 18 being fixed to the stay 12, the stand 16 is fixed to the stay 12, whereby the retraction mechanism 14 is supported by the stay 12. A substantially circular cylinder shaped support shaft 20 is provided integrally at an upper side of the fixing section 18, and an axial direction of the support shaft 20 is disposed in the up-down direction.

A certain number of (in the present embodiment, two) substantially rectangular column shaped restraint projections 22 acting as a restraint section configuring a restraint means are provided integrally at an outer circumferential side of the support shaft 20 in an upper surface of the fixing section 18, and the certain number of restraint projections 22 each have their longitudinal directions curved along a circumferential direction of the support shaft 20 and are disposed at equal intervals in the circumferential direction of the support shaft 20. Moreover, both end surfaces in the longitudinal direction of the restraint projection 22 are inclined in a direction oriented downwardly with increasing progress to an outside in the longitudinal direction of the restraint projection 22.

Figure 5:
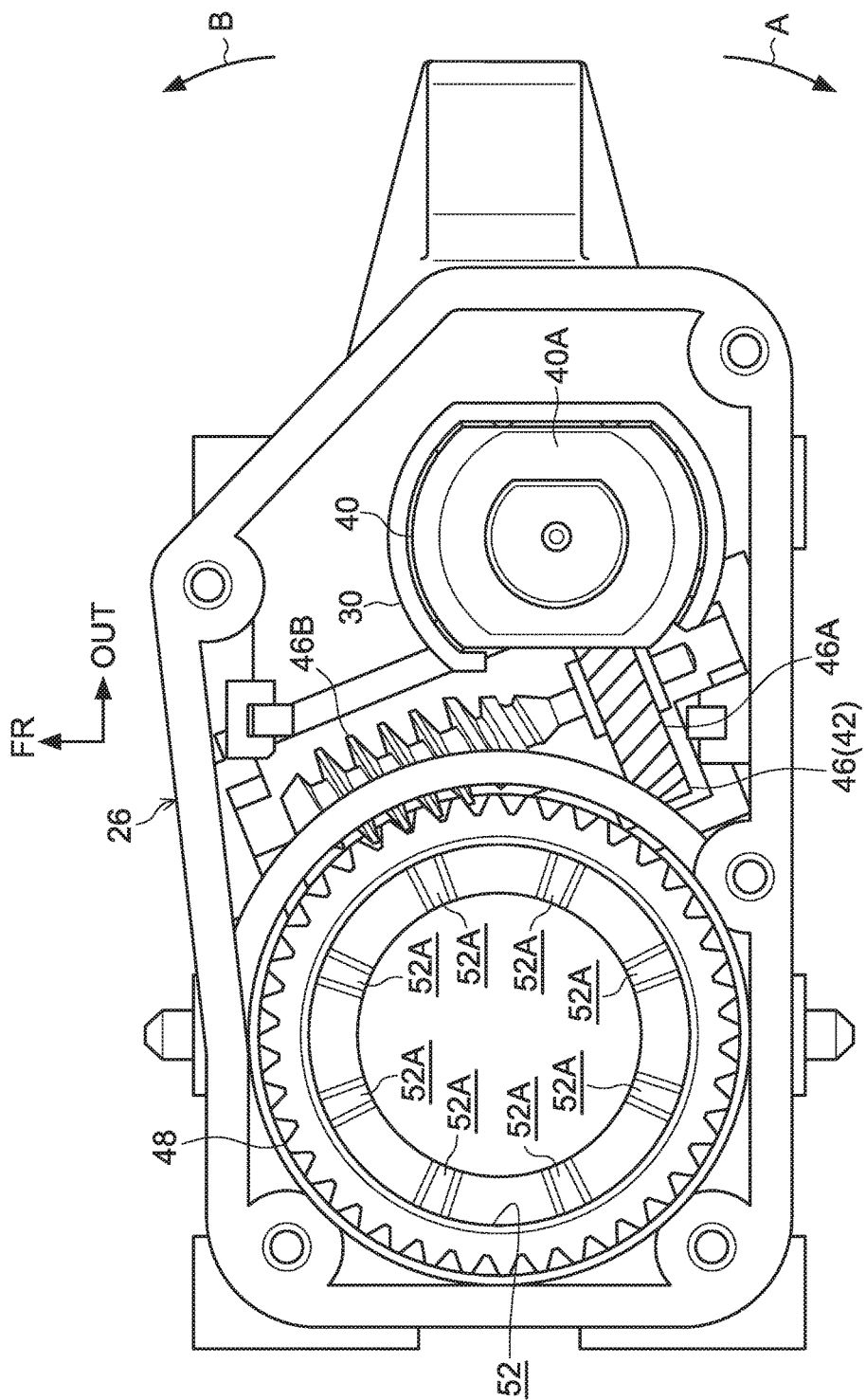
FIG. 5 is a plan view looking from above showing the main sections of the retraction mechanism in the vehicular door mirror device according to the first embodiment of the present invention.

A pivoting body 24 is pivotably supported by the support shaft 20 of the stand 16, and the pivoting body 24 is configured so as to be capable of pivoting in a retraction direction (a direction of arrow A of FIG. 5) and a deployment direction (a direction of arrow B of FIG. 5), around the support shaft 20.

A lower side portion of the pivoting body 24 is provided with a container-like case 26 (refer to FIG. 6) made of a resin acting as a pivoting member, and an upper surface of the case 26 is open.

A circular cylinder shaped support tube 28 acting as a first support section is formed integrally in an inner portion in the vehicle width direction of a lower wall (a bottom wall) of the case 26, and the support tube 28 has its axial direction disposed in the up-down direction and penetrates the lower wall of the case 26. An inside of the support tube 28 is coaxially penetrated by the support shaft 20, and the case 26 is pivotably supported by the support shaft 20. A lower surface of the support tube 28 is mounted on the fixing section 18 of the stand 16, whereby movement downward of the case 26 is locked.

A certain number of (in the present embodiment, two) substantially rectangular column shaped pivot projections (illustration omitted) acting as a pivot section configuring the restraint means are provided integrally at an outer circumferential side of the support tube 28 in a lower surface (bottom surface) of the case 26, and the certain number of pivot projections each have their longitudinal directions curved along a circumferential direction of the support tube 28 and are disposed at equal intervals in the circumferential direction of the support tube 28. Moreover, both end surfaces in the longitudinal direction of the pivot projection are inclined in a direction oriented upwardly with increasing progress to an outside in the longitudinal direction of the pivot projection. The end surface in the longitudinal direction on a deployment direction side of the pivot projection is abutted on the end surface in the longitudinal direction on a retraction direction side of the restraint projection 22 in the stand 16, whereby pivoting in the deployment direction of the case 26, and consequently of the pivoting body 24 is limited, whereby the pivoting body 24 is disposed in a deployed position.

A substantially elliptical tube shaped assembly tube 30 acting as a second support section is formed integrally in an outer portion in the vehicle width direction in an upper section of the case 26, and the assembly tube 30 has its axial direction disposed in parallel with the axial direction of the support tube 28, and is projected upwardly. A circular cylinder shaped through tube 32 is formed integrally at a lower end position of the assembly tube 30 in the upper section of the case 26, and the through tube 32 is disposed coaxially with the assembly tube 30. A circular support hole 34 is formed in the lower wall of the case 26, and the support hole 34 is disposed coaxially with the through tube 32 and has its upper side open.

An upper side of the case 26 is provided with a container-like cover 36 made of a resin acting as a covering member, and a lower surface of the cover 36 is open. A lower end of the cover 36 is fixed to an outer periphery of an upper end section of the case 26, and the cover 36 covers the upper side of the case 26.

A substantially circular cylinder shaped housing tube 38 is formed integrally in an inner portion in the vehicle width direction of the cover 36, and the housing tube 38 is disposed coaxially with the support tube 28 of the case 26. The support shaft 20 of the stand 16 is housed coaxially on an inside of the housing tube 38, and an upper end section of the support shaft 20 is configured so as to be capable of rotatably supporting an upper end section of the housing tube 38.

A motor 40 acting as a drive means is provided at the inside of the case 26.

The motor 40 is provided with a substantially elliptical column shaped main body section 40A acting as a second supported section, and the main body section 40A is assembled by being coaxially fitted from above inside the assembly tube 30 of the case 26. The main body section 40A is supported in a radial direction (a horizontal direction) by the assembly tube 30 whereby its movement in an entire radial direction is locked, and the main body section 40A is supported from below by the through tube 32 of the case 26 whereby its movement downward is locked, and is configured so as to be capable of having its movement upward locked by an upper wall of the cover 36.

The motor 40 is provided with an output shaft 40B (a motor shaft) made of a metal, and the output shaft 40B is extended out downwardly and coaxially from the main body section 40A. The output shaft 40B is supported in a radial direction (a horizontal direction) by the main body section 40A whereby its movement in an entire radial direction is locked, and the output shaft 40B coaxially penetrates the through tube 32 of the case 26 to be extended out downwardly of the through tube 32. Moreover, by the retraction mechanism 14 being actuated and the motor 40 being driven, the motor 40 generates a drive force, whereby the output shaft 40B is rotated (the drive force is outputted).

A gear mechanism 42 acting as a transmission mechanism is provided at the inside of the case 26.

The gear mechanism 42 is provided with a worm gear 44 made of a resin acting as a transmission gear, on a lower side of the motor 40, and an axial direction of the worm gear 44 is disposed in the up-down direction. A lower end section of the worm gear 44 is supported (disposed) freely rotating in the support hole 34 of the case 26, and the lower end section of the worm gear 44 is supported in a radial direction (a horizontal direction) by a circumferential surface of the support hole 34 whereby its movement in an entire radial direction is locked, and is supported from below (one side in the axial direction) by a lower surface of the support hole 34 whereby its movement downward is locked. The output shaft 40B of the motor 40 is inserted coaxially from above in the worm gear 44, and an upper side portion of the worm gear 44 is configured so as to be capable of having its movement in an entire radial direction (an entire horizontal direction) locked by the output shaft 40B. The worm gear 44 is configured as an initial-stage gear to which the drive force generated by the motor 40 is initially transmitted of the transmission gears supported by the case 26, and by the output shaft 40B being rotated, the worm gear 44 is rotated integrally with the output shaft 40B.

The gear mechanism 42 is provided with a worm shaft 46 acting as a transmission gear (an intermediate gear), on an inside in the vehicle width direction of the worm gear 44. Both end sections in an axial direction of the worm shaft 46 are supported freely rotating in the lower wall of the case 26, and the axial direction of the worm shaft 46 is disposed in the horizontal direction. Both end sections in the axial direction of the worm shaft 46 are configured so as to be capable of having their movement to both radial direction sides in the horizontal direction locked by the lower wall of the case 26, and both end sections in the axial direction of the worm shaft 46 have their movement downward locked by the lower wall of the case 26. The worm shaft 46 is configured so as to be capable of having its movement to both axial direction sides locked by the lower wall of the case 26, and the worm shaft 46 is configured so as to be capable of having its movement upward locked by the cover 36.

A helical gear section 46A (a worm wheel) made of a resin is provided coaxially at one end side portion (a vehicle rear side portion) of the worm shaft 46, and a worm gear section 46B (a worm) made of a metal is provided coaxially at the other end side portion (a vehicle front side portion) of the worm shaft 46. By the helical gear section 46A being meshed (engaged) with the worm gear 44 and the worm gear 44 being rotated, the helical gear section 46A and the worm gear section 46B are integrally rotated, whereby the worm shaft 46 is rotated.

A gear plate 48 (a worm wheel gear) made of a metal acting as a limit gear (an output-stage gear) is penetrated by the support shaft 20 of the stand 16, and the gear plate 48 is disposed on an inside in the vehicle width direction of the worm shaft 46.

A support recess 50 which is circular in planar view acting as a first supported section is formed coaxially in a lower surface of the gear plate 48, and the support recess 50 is open downwardly. The support tube 28 of the case 26 is engaged coaxially from below in the support recess 50, and the gear plate 48 is rotatably supported by the support tube 28. The gear plate 48, by a circumferential surface of the support recess 50 being supported in a radial direction (a horizontal direction) by an outer circumferential surface of the support tube 28, has its movement in an entire radial direction locked, and by an upper surface of the support recess 50 being supported from below (one side in an axial direction) by an upper surface of the support tube 28, has its movement downward locked.

An engagement recess 52 (refer to FIG. 5) which is circular in planar view is formed coaxially in an upper surface of the gear plate 48, and the engagement recess 52 is open upwardly. A plurality of limit recesses 52A acting as limited sections are formed in a lower surface of the engagement recess 52, and the plurality of limit recesses 52A are disposed at equal intervals in a circumferential direction of the gear plate 48. The limit recess 52A is configured in an inverted trapezoidal shape in cross section, and both side surfaces of the limit recess 52A are respectively inclined in a direction oriented upwardly with increasing progress to an outside in the circumferential direction of the gear plate 48 of the limit recess 52A.

An upper side of the gear plate 48 is provided with a substantially circular cylinder shaped clutch plate 54 made of a metal acting as a limit member. The clutch plate 54 is coaxially penetrated by the support shaft 20 of the stand 16, and the clutch plate 54 is nonrotatably supported by the support shaft 20 and is configured so as to be capable of moving in the up-down direction with respect to the support shaft 20 to be coaxially engaged in the engagement recess 52 of the gear plate 48.

A plurality of limit projections 54A acting as limit sections are formed on a lower surface of the clutch plate 54, and the plurality of limit projections 54A are disposed at equal intervals in a circumferential direction of the clutch plate 54. The limit projection 54A is configured in an inverted trapezoidal shape in cross section, and both side surfaces of the limit projection 54A are respectively inclined in a direction oriented downwardly with increasing progress to an inside in the circumferential direction of the clutch plate 54 of the limit projection 54A. A cross-sectional shape of the limit projection 54A is configured in a shape that is similar and slightly smaller with respect to a cross-sectional shape of the limit recess 52A of the gear plate 48, and the limit projection 54A is inserted in the limit recess 52A.

A spiral rod shaped coil spring 56 made of a metal acting as a biasing member is provided at an upper side of the clutch plate 54, and the support shaft 20 of the stand 16 is coaxially inserted in the coil spring 56.

A substantially annular disk shaped push nut 58 acting as a lock member is provided at an upper side of the coil spring 56, and the push nut 58 is coaxially fixed in the support shaft 20 of the stand 16. The push nut 58 presses the coil spring 56 downwards thereby compressing it, and the coil spring 56 downwardly biases the clutch plate 54. Therefore, the coil spring 56, by its biasing force, maintains a state of the limit projections 54A of the clutch plate 54 being inserted in the limit recesses 52A of the gear plate 48, whereby rotation of the gear plate 48 is limited by the clutch plate 54.

The worm gear section 46B of the worm shaft 46 is meshed (engaged) with the gear plate 48, whereby pivoting of the worm gear section 46B along the circumference of the gear plate 48 is locked, whereby pivoting with respect to the gear plate 48 of the pivoting body 24 is locked. As mentioned above, when the worm gear section 46B is rotated, the drive force generated by the motor 40 is transmitted to the gear plate 48 via the gear mechanism 42 (the worm gear 44 and the worm shaft 46) and the worm gear section 46B is pivoted along the circumference of the gear plate 48, whereby the pivoting body 24 is pivoted, integrally with the worm gear section 46B, around the support shaft 20 of the stand 16.

As shown in FIG. 1, the pivoting body 24 is housed in an inner portion in the vehicle width direction of a substantially rectangular parallelepiped shaped container-like visor 60 acting as a housing member, and a vehicle rear side surface of the visor 60 is open. A substantially rectangular plate shaped mirror 62 acting as a visual recognition means is disposed in a vicinity of the vehicle rear side surface (an open portion) in the visor 60, and the visor 60 covers an entire periphery and a vehicle front side surface of the mirror 62.

The visor 60 and the mirror 62 are supported by being joined to the pivoting body 24, and the visor 60 and the mirror 62 are deployed (developed) by being projected out from the side door. A mirror surface 62A of the mirror 62 is directed to a rear side of the vehicle, thereby enabling visual recognition of the rear side of the vehicle by an occupant (specifically, a driver) of the vehicle, thereby assisting visual recognition of the occupant. Moreover, the visor 60 and the mirror 62 are configured so as to be capable of pivoting, integrally with the pivoting body 24, around the support shaft 20 of the stand 16.

Next, operation of the present embodiment will be described.

In the vehicular door mirror device 10 of the above configuration, the retraction mechanism 14 is actuated whereby the motor 40 is driven, due to which the output shaft 40B is rotated. As a result, in the gear mechanism 42, the worm gear 44 is rotated integrally with the output shaft 40B whereby the worm shaft 46 (the helical gear section 46A and the worm gear section 46B) is rotated, due to which the worm gear section 46B is pivoted along the circumference of the gear plate 48 whereby the pivoting body 24, the visor 60, and the mirror 62 are pivoted, integrally with the worm gear section 46B, around the support shaft 20 of the stand 16.

When the motor 40 is driven whereby the output shaft 40B is rotated in one direction, the worm gear section 46B is pivoted in the retraction direction along the circumference of the gear plate 48, whereby the pivoting body 24, the visor 60, and the mirror 62 are pivoted in the retraction direction (to the vehicle rear side and to the inside in the vehicle width direction). Furthermore, by an end surface in a longitudinal direction on a retraction direction side of a pivot projection in the pivoting body 24 (the case 26) being abutted on an end surface in a longitudinal direction on a deployment direction side of the restraint projection 22 in the stand 16, pivoting in the retraction direction of the pivoting body 24 is stopped whereby the pivoting body 24 is disposed in a retracted position. As a result, the visor 60 and the mirror 62 have their projection out from the side door released, and are thereby retracted.

Subsequently, when the motor 40 is driven whereby the output shaft 40B is rotated in the other direction, the worm gear section 46B is pivoted in the deployment direction along the circumference of the gear plate 48, whereby the pivoting body 24, the visor 60, and the mirror 62 are pivoted in the deployment direction (to the vehicle front side and to the outside in the vehicle width direction). Furthermore, by an end surface in a longitudinal direction on a deployment direction side of the pivot projection being abutted on an end surface in a longitudinal direction on a retraction direction side of the restraint projection 22, pivoting in the deployment direction of the pivoting body 24 is stopped whereby the pivoting body 24 is disposed in the deployed position. As a result, the visor 60 and the mirror 62 are projected out from the side door, and are thereby deployed (reset).

Now, due to the main body section 40A of the motor 40 being supported by only the assembly tube 30 of the case 26 in the radial direction (the horizontal direction) whereby movement in the entire radial direction of the main body section 40A of the motor 40 is locked, and to the gear plate 48 being supported by only the support tube 28 of the case 26 in the radial direction (the horizontal direction) whereby movement in the entire radial direction of the gear plate 48 is locked, the motor 40 and the gear plate 48 are supported by only the case 26 in the horizontal direction (the radial direction of the motor 40 and the gear plate 48).

Therefore, contrary to the case where the motor 40 and the gear plate 48 are supported by separate members in the horizontal direction, dimensional variation (variation of a minimum dimension) in the horizontal direction between central axis lines of the output shaft 40B of the motor 40 and the gear plate 48 can be suppressed, whereby variation in arrangement positions of the worm gear 44 and the worm shaft 46 between the output shaft 40B of the motor 40 and the gear plate 48 can be suppressed. As a result, variation in meshing amount of the worm gear 44 and the helical gear section 46A of the worm shaft 46 can be suppressed, and variation in meshing amount of the worm gear section 46B of the worm shaft 46 and the gear plate 48 can be suppressed, and variation in operating noise of the retraction mechanism 14 can be suppressed, whereby operating noise of the retraction mechanism 14 can be stabilized.

Furthermore, management of dimensions in the horizontal direction between central axis lines of the output shaft 40B of the motor 40 and the gear plate 48 can be easily performed, and the pivoting body 24, and consequently the retraction mechanism 14 can be easily manufactured.

Moreover, even if an external force (including own weights of the visor 60, the mirror 62, and so on) is inputted to the pivoting body 24 via the visor 60, the mirror 62, and so on, change of dimensions in the horizontal direction between central axis lines of the output shaft 40B of the motor 40 and the gear plate 48 can be suppressed, and operating noise of the retraction mechanism 14 can still be stabilized.

Furthermore, when pivoting of the pivoting body 24 is stopped by the end surface in the longitudinal direction of the pivot projection of the pivoting body 24 being abutted on the end surface in the longitudinal direction of the restraint projection 22 of the stand 16, even if a drive force (a force in the horizontal direction to a side that the gear plate 48 is separated from the worm gear section 46B of the worm shaft 46) is exerted on the gear plate 48 from the worm gear section 46B and a reaction force of said drive force (a force in the horizontal direction to a side that the worm gear section 46B is separated from the gear plate 48) is exerted on the worm gear section 46B from the gear plate 48, the drive force exerted on the gear plate 48 and the reaction force of the drive force exerted on the worm gear section 46B are both supported by the case 26. Therefore, it can be suppressed that the pivoting body 24 is tilted with respect to the support shaft 20 of the stand 16 when pivoting of the pivoting body 24 is stopped.

Moreover, the gear plate 48 has its movement downward locked by being supported from below by the case 26 (the support tube 28) only at a portion on the inside in the radial direction of the gear plate 48 (at the upper surface of the support recess 50). Therefore, an increase in sliding friction between the case 26 and the gear plate 48 can be suppressed when the case 26 is pivoted with respect to the gear plate 48, even when the gear plate 48 is supported by the case 26 in the radial direction.

Second Embodiment

FIG. 7, in a cross-sectional view looking from a vehicle rear, shows a retraction mechanism 14 in a vehicular door mirror device 70 acting as a vehicular visual recognition device according to a second embodiment of the present invention.

The vehicular door mirror device 70 according to the present embodiment has a configuration substantially similar to that of the above-described first embodiment, but differs in the following points.

As shown in FIG. 7, in the vehicular door mirror device 70 according to the present embodiment, in a case 26 of the retraction mechanism 14, a through tube 32 and a support hole 34 configure a second support section, and an upper end section of a worm gear 44 in a gear mechanism 42 is coaxially inserted in the through tube 32.

A circular cylinder shaped support column 44A configuring a second supported section is formed integrally on an outer circumference of the upper end section of the worm gear 44, and the support column 44A is disposed coaxially with the worm gear 44. The support column 44A is supported (disposed) by being engaged freely rotating in the through tube 32 of the case 26, and the upper end section of the worm gear 44 is supported in a radial direction (a horizontal direction) by an inner circumferential surface of the through tube 32, whereby movement in the entire radial direction of the upper end section of the worm gear 44 is locked.

A lower end section of the worm gear 44 configures the second supported section, and similarly to in the above-described first embodiment, the lower end section of the worm gear 44 is supported (disposed) freely rotating in the support hole 34 of the case 26.

Now, similar actions and effects to those of the above-described first embodiment can be displayed also in the present embodiment.

Specifically, due to the upper end section (the support column 44A) and the lower end section of the worm gear 44 being supported by only the case 26 (the through tube 32 and the support hole 34) in the radial direction (the horizontal direction) whereby movement in the entire radial direction of the upper end section and the lower end section of the worm gear 44 is locked, and to the gear plate 48 being supported by only the support tube 28 of the case 26 in the radial direction (the horizontal direction) whereby movement in the entire radial direction of the gear plate 48 is locked, the worm gear 44 and the gear plate 48 are supported by only the case 26 in the horizontal direction (the radial direction of the worm gear 44 and the gear plate 48).

Therefore, contrary to the case where the worm gear 44 and the gear plate 48 are supported by separate members in the horizontal direction, dimensional variation (variation of a minimum dimension) in the horizontal direction between central axis lines of the worm gear 44 and the gear plate 48 can be suppressed, whereby variation in arrangement position of the worm shaft 46 between the worm gear 44 and the gear plate 48 can be suppressed. As a result, variation in meshing amount of the worm gear 44 and the helical gear section 46A of the worm shaft 46 can be suppressed, and variation in meshing amount of the worm gear section 46B of the worm shaft 46 and the gear plate 48 can be suppressed, and variation in operating noise of the retraction mechanism 14 can be suppressed, whereby operating noise of the retraction mechanism 14 can be stabilized.

Furthermore, management of dimensions in the horizontal direction between central axis lines of the worm gear 44 and the gear plate 48 can be easily performed, and the pivoting body 24, and consequently the retraction mechanism 14 can be easily manufactured.

Moreover, even if an external force (including own weights of the visor 60, the mirror 62, and so on) is inputted to the pivoting body 24 via the visor 60, the mirror 62, and so on, change of dimensions in the horizontal direction between central axis lines of the worm gear 44 and the gear plate 48 can be suppressed, and operating noise of the retraction mechanism 14 can still be stabilized.

Note that in the present embodiment, the upper end section (one end section in the axial direction) and the lower end section (the other end section in the axial direction) of the worm gear 44 were supported in the radial direction by the case 26. However, it is only required that a plurality of axial direction positions of the worm gear 44 are supported in the radial direction by the case 26.

Moreover, in the above-described first embodiment and second embodiment, the vehicular door mirror devices 10, 70 were adopted as the vehicular visual recognition device of the present invention. However, it is possible to adopt as the vehicular visual recognition device of the present invention the likes of another vehicular mirror device (another vehicular outer mirror device on the outside of the vehicle (for example, a vehicular fender mirror device) or a vehicular inner mirror device on the inside of the vehicle) or a vehicular camera device (a device that assists visual recognition of the occupant by filming).

The disclosure of Japanese Patent Application No. 2014-247094 filed on Dec. 5, 2014 is incorporated in the present specification by reference in its entirety.

The invention claimed is:

1. A vehicular visual recognition device comprising:
a support body supported by a vehicle body side;
a pivoting member pivotably supported by the support body;
a drive means having an output shaft supported by the pivoting member and configured so as to be capable of generating a drive force;
a limit gear directly supported in a radial direction only by the pivoting member, and indirectly engaging the output shaft, rotation of the limit gear being limited, and the drive force generated by the drive means being transmitted to the limit gear whereby the pivoting member is pivoted; and
a visual recognition means provided so as to be capable of pivoting integrally with the pivoting member, the visual recognition means assisting visual recognition of an occupant of a vehicle, and the visual recognition means being retracted or deployed by the pivoting member being pivoted.

2. The vehicular visual recognition device according to claim 1, comprising a main body section provided at the drive means, the main body section being supported by the pivoting member whereby the drive means is supported by the pivoting member.

3. The vehicular visual recognition device according to claim 1, comprising an output shaft provided at the drive means and by which the drive means is supported by the pivoting member in the radial direction.

4. The vehicular visual recognition device according to claim 3, wherein in the drive means, the output shaft is supported in the radial direction.

5. The vehicular visual recognition device according to claim 3, wherein a central axis line of the output shaft and a central axis line of the limit gear are separated from each other.

6. The vehicular visual recognition device according to claim 1, wherein the limit gear does not contact the support body in the radial direction of the limit gear, and the limit gear is locked from radial movement only by the pivoting member.

7. A vehicular visual recognition device comprising:
a support body supported by a vehicle body side;
a pivoting member pivotably supported by the support body;
a drive means having an output shaft configured so as to be capable of generating a drive force;
a transmission mechanism which has at least one transmission gear disposed at the pivoting member, and in which a plurality of axial direction positions of the transmission gear, to which the drive force generated by the drive means is initially transmitted, are supported by the pivoting member in a radial direction, the transmission mechanism transmitting the drive force generated by the drive means;
a limit gear rotatably supported in the radial direction only by the pivoting member, and indirectly engaging the output shaft, rotation of the limit gear being limited, and the drive force generated by the drive means being transmitted to the limit gear via the transmission mechanism whereby the pivoting member is pivoted; and
a visual recognition means provided so as to be capable of pivoting integrally with the pivoting member, the visual recognition means assisting visual recognition of an occupant of a vehicle, and the visual recognition means being retracted or deployed by the pivoting member being pivoted.

8. The vehicular visual recognition device according to claim 7, wherein a central axis line of the initial-stage gear and a central axis line of the limit gear are separated from each other.

9. The vehicular visual recognition device according to claim 1 or claim 7, wherein an inner portion in the radial direction of the limit gear is supported in an axial direction by the pivoting member.

10. The vehicular visual recognition device according to claim 7, wherein the limit gear does not contact the support body in the radial direction of the limit gear, and the limit gear is locked from radial movement only by the pivoting member.

* * * * *